INVENTORS
HUMBERT C. GODOY
NORMAN E. GROSS

BY [signature]
AGENT

Oct. 8, 1968 H. C. GODOY ET AL 3,405,258

RELIABILITY TEST FOR COMPUTER CHECK CIRCUITS

Filed April 7, 1965 13 Sheets-Sheet 5

Oct. 8, 1968 H. C. GODOY ET AL 3,405,258

RELIABILITY TEST FOR COMPUTER CHECK CIRCUITS

Filed April 7, 1965 13 Sheets-Sheet 9

RELIABILITY TEST FOR COMPUTER CHECK CIRCUITS 3,405,258

RELIABILITY TEST FOR COMPUTER CHECK CIRCUITS

Humbert C. Godoy and Norman E. Gross, Vestal, N.Y., assignors to International Business Machines Corporation, New York, N.Y., a corporation of New York Filed Apr. 7, 1965, Ser. No. 446,184
7 Claims. (Cl. 235—153)

ABSTRACT OF THE DISCLOSURE

The disclosure sets forth a reliability check circuit for the arithmetic and logic unit (ALU) of a computer. The check circuit is comprised of eleven exclusive OR circuits which compare the positive and negative outputs issued by the adder portion of the ALU, the adder portion being a duo-binary device. Thus, each bit of the adder portion is compared with a corresponding non-bit by means of the exclusive OR circuit. A read only storage means supplies a plurality of pattern control signals in each computer cycle of operation. Appropriate sequences of these signals are utilized for operation of the computer during test operations as well as during arithmetic and logic operations. Test operations are controlled by means of console switches for initiating the appropriate sequence of microprograms for the test operations.

This invention is concerned with computer systems and, more specifically, to reliability testing apparatus for testing the performance of checking circuits provided to check the arithmetic and logic unit of a computer.

Prior art techniques and means for effecting reliability tests required shutting down of the system in order to gain physical access to the various units designated for tests and then applying conventional testing apparatus under laborious maintenance routines. This approach has resulted in a considerable amount of down time and inconvenience to the user.

The present invention is adapted to perform reliability tests without dismantling or disabling the computer system by virtue of built-in hardware, enabling its operations within the computer with simplicity and ease.

In one of the most vital areas of the computer system; for example, the ALU (arithmetic and logic unit), wherein are performed all arithmetic and logical functions, the reliability testing means is constituted of circuit means interwoven with the gates providing access to the various components forming a part of the arithmetic and logic unit. During normal operations of the computer, these gates are actuated by computer hardware, inherently a part of the system, called upon to perform the various arithmetic and logic functions. The reliability testing circuits, also connected to these gates, however, are in a quiescent state, while the various arithmetic and logic functions are being performed. When it is desired to test the reliability of the arithmetic and logic check circuits, the reliability test circuits, under control of a test routine, built into the system, is selected by the operator simply by addressing the routine through the normal console control. The testing of the checking circuits is thereupon undertaken, under control of the microprogram routine. Suitable indicators are automatically enabled when the check circuits fail to perform reliably during the test operation.

The principal object resides in the provision of reliability testing means for performing reliability tests on vital sections of the computer with relative ease and simplicity and without disabling the computer.

Another object resides in performing a reliability test on the checking circuits of a computer by novel means uniquely interconnected with the computer to provide a desirable feature without adding materially to the overall cost and without increasing the size of the computer.

The foregoing and other objects, features and advantages of the invention will be apparent from the following more particular description of a predetermined embodiment of the invention, as illustrated in the accompanying drawings.

Figure 4A:
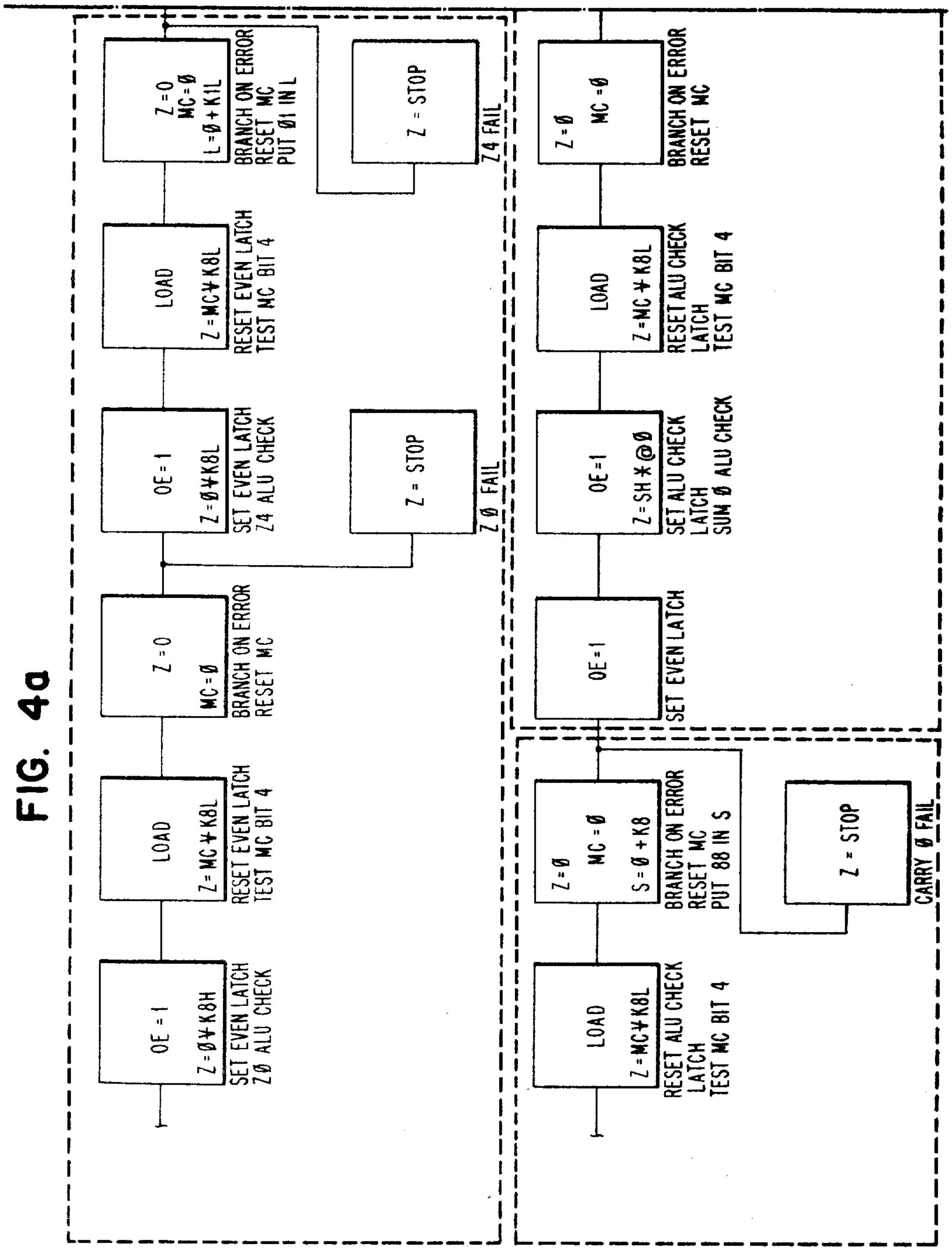
Figure 4B:
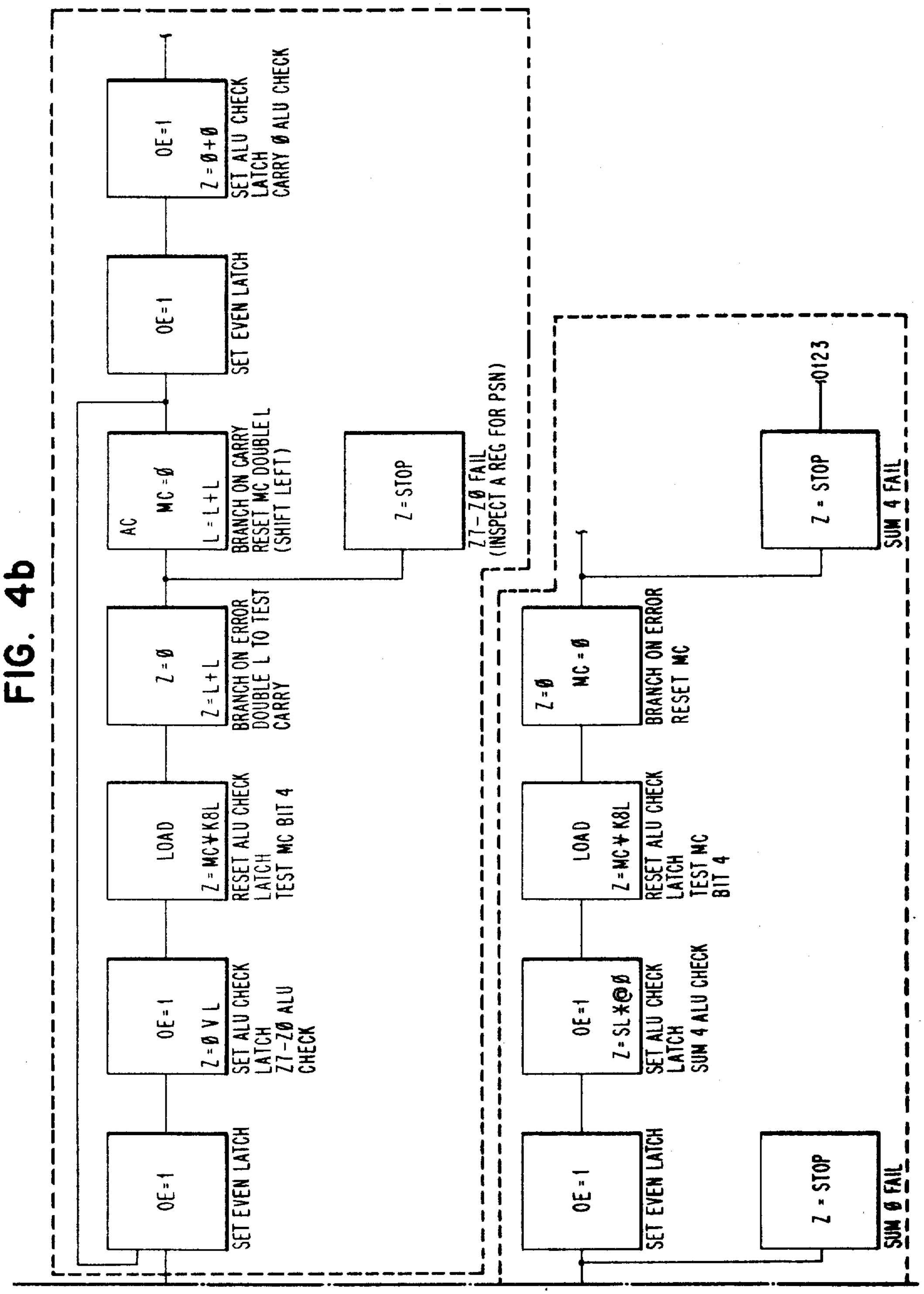

FIGS. 4*a* and 4*b* show a series of microprogram steps defining machine activities necessary to carry out tests on the arithmetic and logic (ALU) checking circuits of the computer.

Figure 1:
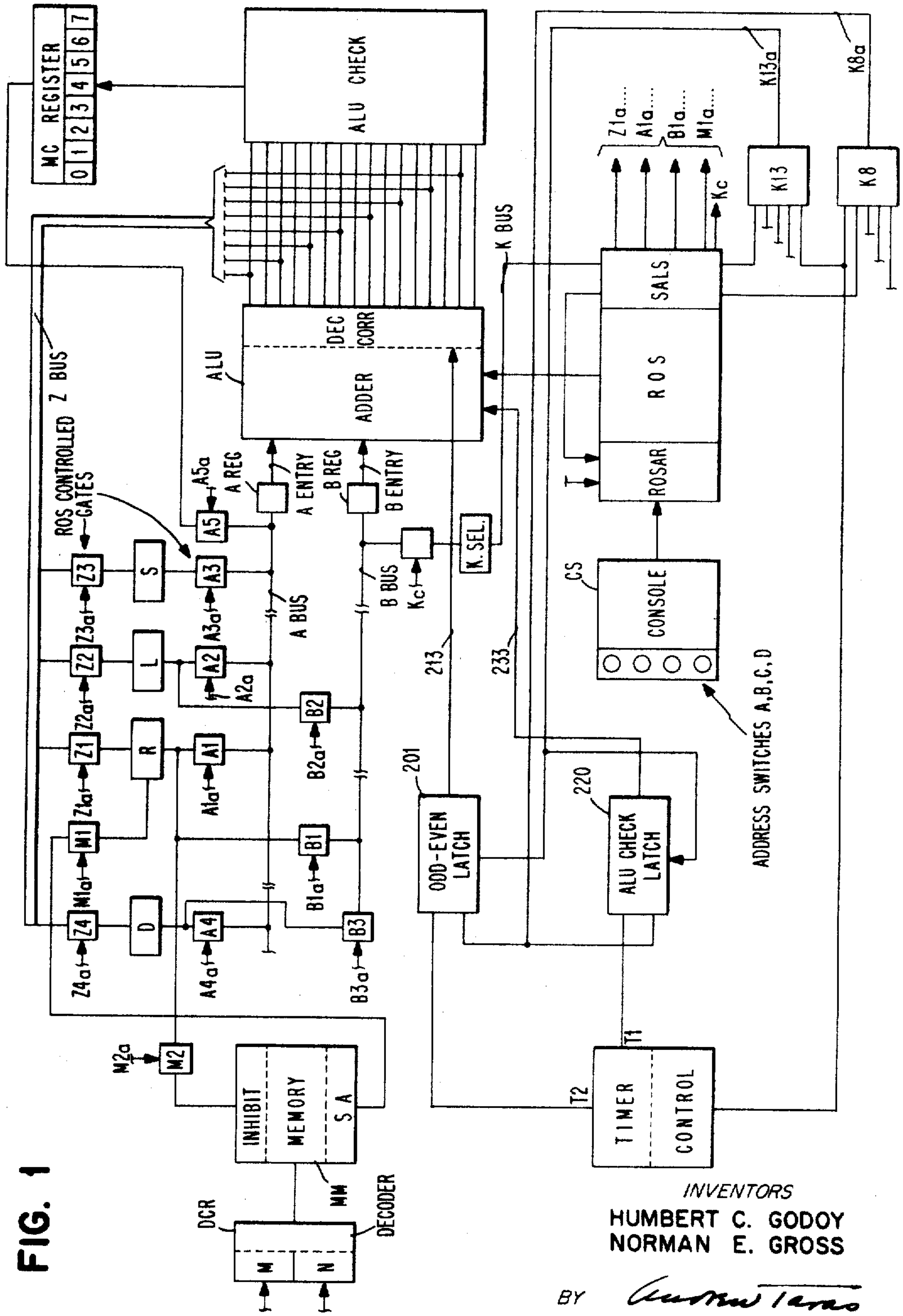
FIG. 1 is a schematic arrangement showing the principal circuits constituting the invention interrelated with only those portions of the computer system necessary to carry out a reliability test.

FIG. 1 is a schematic arrangement of some of the computer circuits fully described in the pending application Ser. No. 357,372 connecting the principal reliability testing circuits constituting the invention. The portion of the computer shown in FIG. 1 comprises three main buses, A bus, B bus and Z bus; a plurality of data registers, namely R, L, D and S; input registers, namely A register and B register; an error indicating register MC; an arithmetic and logic unit (ALU); a main memory (MM); and a read-only storage (ROS). The Z bus communicates with the registers R, L, D, S and MC by way of read-only storage control gates $Z_1$, $Z_2$, $Z_3$ $Z_4$ and $Z_5$, respectively, under control of read-only storage control signals $Z_{1a}$, $Z_{2a}$, $Z_{3a}$, $Z_{4a}$ and $Z_{5a}$, respectively. The A bus communicates with most of the data registers of the computer, among which are the R, L, D, S and MC registers, by way of read-only storage control gates $A_1$, $A_2$, $A_3$, $A_4$ and $A_5$, respectively, under control of read-only storage control signals $A_{1a}$, $A_{2a}$, $A_{3a}$, $A_{4a}$ and $A_{5a}$, respectively. The B bus communicates with the R, L and D registers by way of read-only storage control gates $B_1$, $B_2$ and $B_3$ under the control of read-only storage control signals $B_{1a}$, $B_{2a}$ and $B_{3a}$, respectively.

The main memory MM communicates with the R register by way of control gates $M_1$ and $M_2$ under control of control signals $M_{1a}$ and $M_{2a}$, respectively. Access to the main memory MM is generally made by admitting an address in memory address registers M and N. The address is decoded by a decoder DCR and transmitted to the main memory MM to access data and macro-instructions, which determine the course of activity the computer takes to process an arithmetic or logic function. The computer is virtually under control of the read-only storage which issues patterns of control signals, a few of which are shown; namely, $Z_{1a}$, $A_{1a}$, $B_{1a}$, $M_{1a}$, etc. These signals extend from the right-hand side of the read-only storage, specifically from sense amplifier latches, referenced SAL's, which are described in detail in the aforementioned pending application. The control signals are issued from the SAL's, in turn fed by pattern signals derived from specific pattern generators constituting the read-only storage ROS. These pattern generators are fully described in the pending application and are generally referred to as microprogram steps. Access to the read-only storage ROS is by way of an address register designated ROSAR, into which an address is transmitted initially by the control console CS containing address settable switches A, B, C and D; and, throughout the course of operations, addresses are determined by means of machine-generated conditions, as well as partial address information generated by the current microprogram step.

Among the pattern signals generated are those signals defining constants for developing binary weighted values of 13 (1101), 8 (1000) and 1 (0001). These values are utilized in the performance of the reliability test. The constant 13 is fed to an AND circuit designated K13, the constant 8 is fed to an AND circuit referenced K8, and constants 8 and 1 are entered into the B bus via a constant selector.

The principal reliability control circuits include an odd/even latch 201, an ALU check latch 220, control means for enabling the AND circuits K13 and K8, and the lines 213 and 233 which are interconnected to AND gates constituting a portion of the arithmetic and logic unit (ALU). The manner in which these interconnections are made with the gates of the ALU will be described shortly hereinafter in connection with FIGS. 3*a* through 3*h*. For the present it will be shown how, in connection with FIGS. 2*a* and 2*b*, and under what conditions the voltage level signals on the lines 213 and 233 are controlled to activate the reliability test operation in the ALU.

Figures 2, 2A, 3:
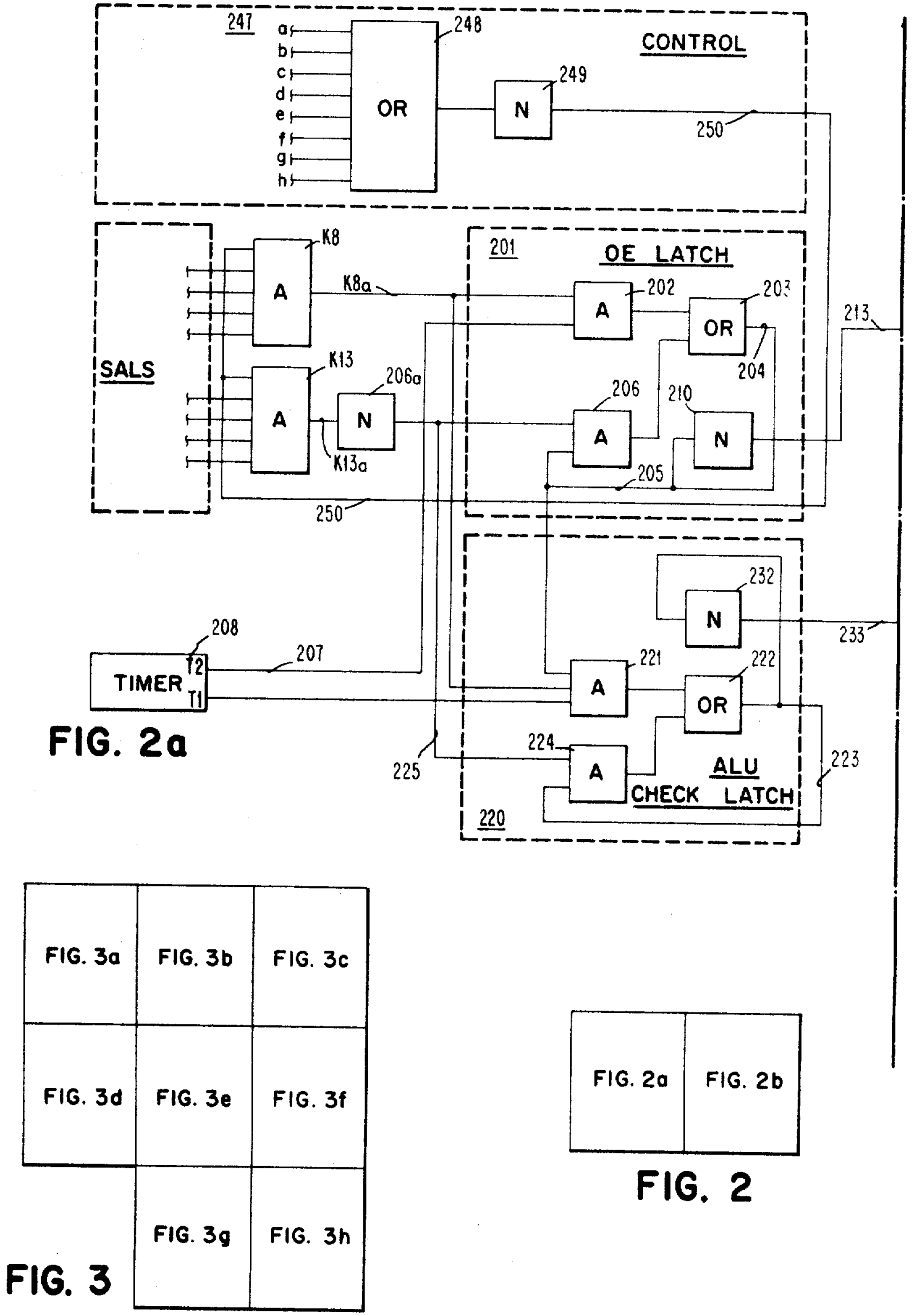
FIG. 2 shows how
FIG. 2*a* and 2*b* are combined to form the principal reliability test circuits of the invention in performing a reliability test on checking circuits forming a part of the arithmetic and logical section of the computer.
FIG. 3 shows how
Figure 2B:
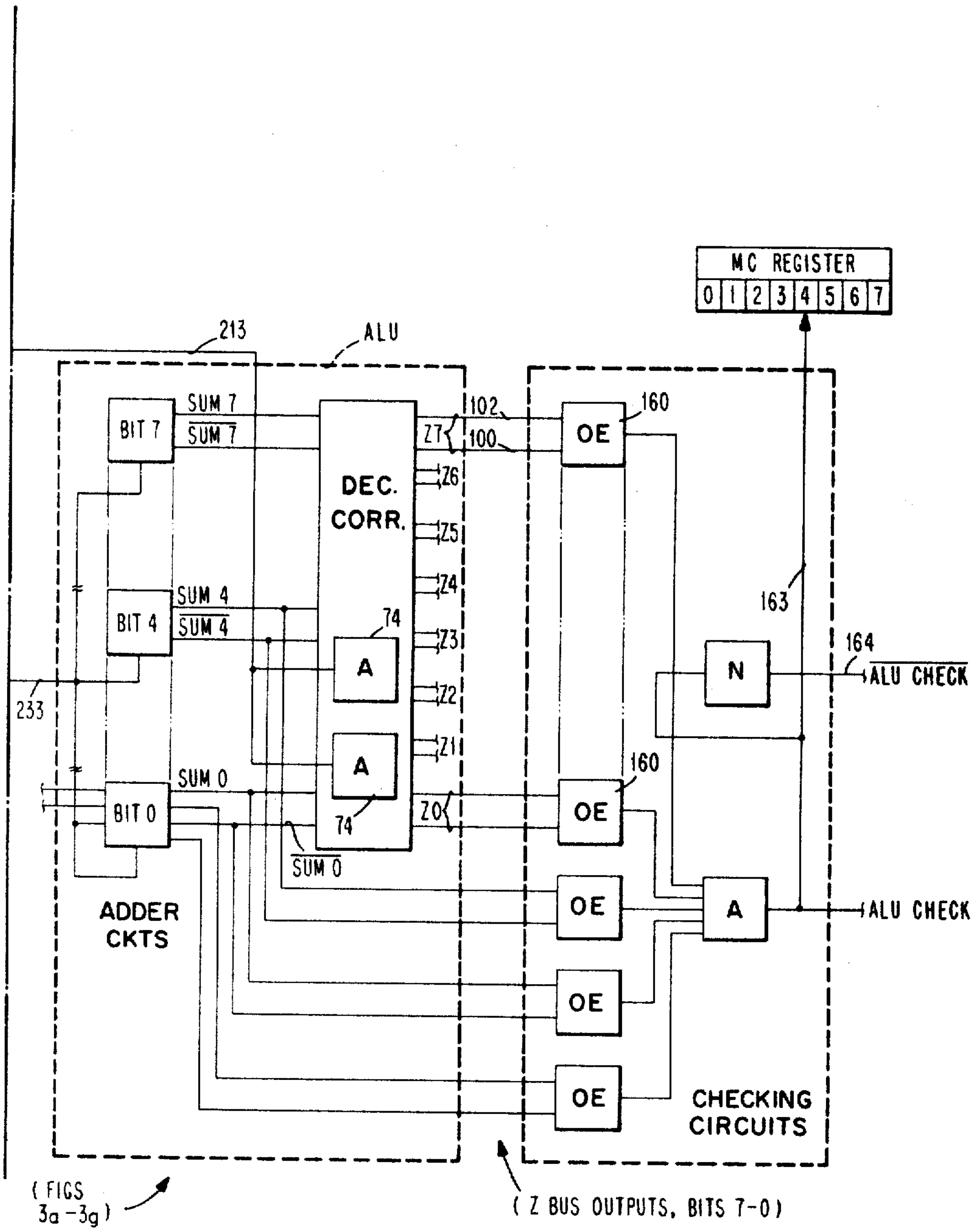

Referring to FIGS. 2*a* and 2*b*, the control for enabling the AND circuits K8 and K13 is developed by means of control line 250 when the latter transmits an up level voltage. This occurs when all of the control lines 247*a* through 247*h* are each at a down level. Under this condition, OR circuit 248, into which these lines are connected, passes a down level signal that is inverted by means of inverter 249, thereby providing a positive up level output on the control line 250 which is connected to both the AND circuits K8 and K13. When the AND circuit K8 is enabled, it provides a positive signal on output line K8*a* which provides a turn-on signal to the latch 201. This latch includes an AND circuit 202 which serves as the turn-on input, an OR circuit 203, and a latchback path 204, 205 connected to AND circuit 206, having its output connected to OR circuit 203. The AND circuit 206 is also connected to the AND circuit K13 by way of line K13*a* and an inverter 206*a*. The AND circuit 202 is connected to the timer 208 by way of line 207. This line carries a timing signal $T_2$ which provides a definite time interval for turning the latch on when the line K8*a* is positive. The output of the OR circuit 203 passes through line 204 and through an inverter 210 to control line 213. When the latch 201 is on, the control line 213 is at a down level. Conversely, when the latch is off, the control line 213 is at an up level, which is the quiescent state. In the ensuing explanation of the microprogram routine, the statement, "*OE*=1," indicates the enabling of the AND circuit K8 to provide a turn-on signal to the odd/even latch 201 to turn on the latter.

The ALU check latch 220 comprises AND circuit 221 which serves as the turn-on to the latch, OR circuit 222, and latchback path 223, including AND circuit 224, in turn connected to the OR circuit 222 in the manner shown. The turnoff AND circuit 224 has an input line 225 connected to the inverter 206*a* output. The output of the OR circuit 222 is fed through an inverter 232 to output control line 233. The latch 220, when on, issues a down level signal on the control line 233. Conversely, when the latch 220 is off, the control line passes an up level signal, the quiescent state, through the control line 233. The turning on of the ALU check latch 220 is accomplished by the second signal of two successive turn-on signals issued by the positive output of the AND circuit K8. Both latches 201 and 220 are turned off by applying a negative signal to the AND circuit 206 and the AND circuit 224. This negative signal is derived by enabling AND circuit K13 which provides, on its output line K13*a*, a positive output which is inverted by the inverter 206*a*, thereby developing the negative signal to the inputs of the AND circuits 206 and 224. By virtue of the negative signal, the latchback path for each of the latches 201 and 220 is broken, thereby causing both latches to turn off. In the description of the microprograms, the statement, "LOAD," designates turn-off of the latches 201 and 220.

The outputs of both latches 201 and 220 are applied to the reliability control lines 213 and 233, the former being connected to AND circuits 74 and 74', located within the decimal corrector; and the latter, line 233, being connected to AND circuits in each of the adder circuits for bits 7 through 0. The actual connections to the specific AND circuits is shown in FIGS. 3*a* through 3*h*.

Figure 3A:
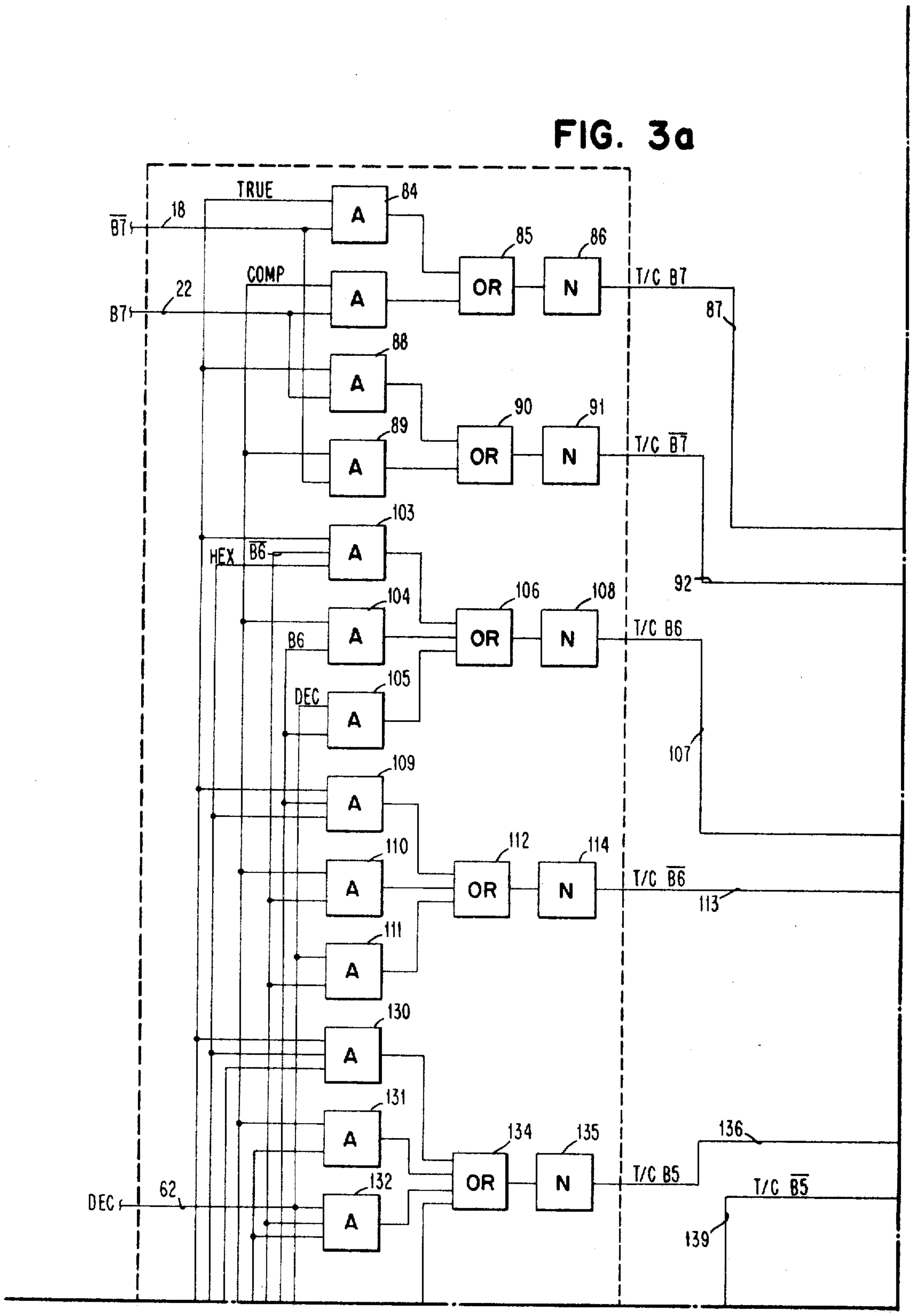
FIGS. 3*a* through 3*h* are assembled to show the detailed circuitry of the ALU, its checking circuits and a portion of the reliability test circuits.
Figure 3B:
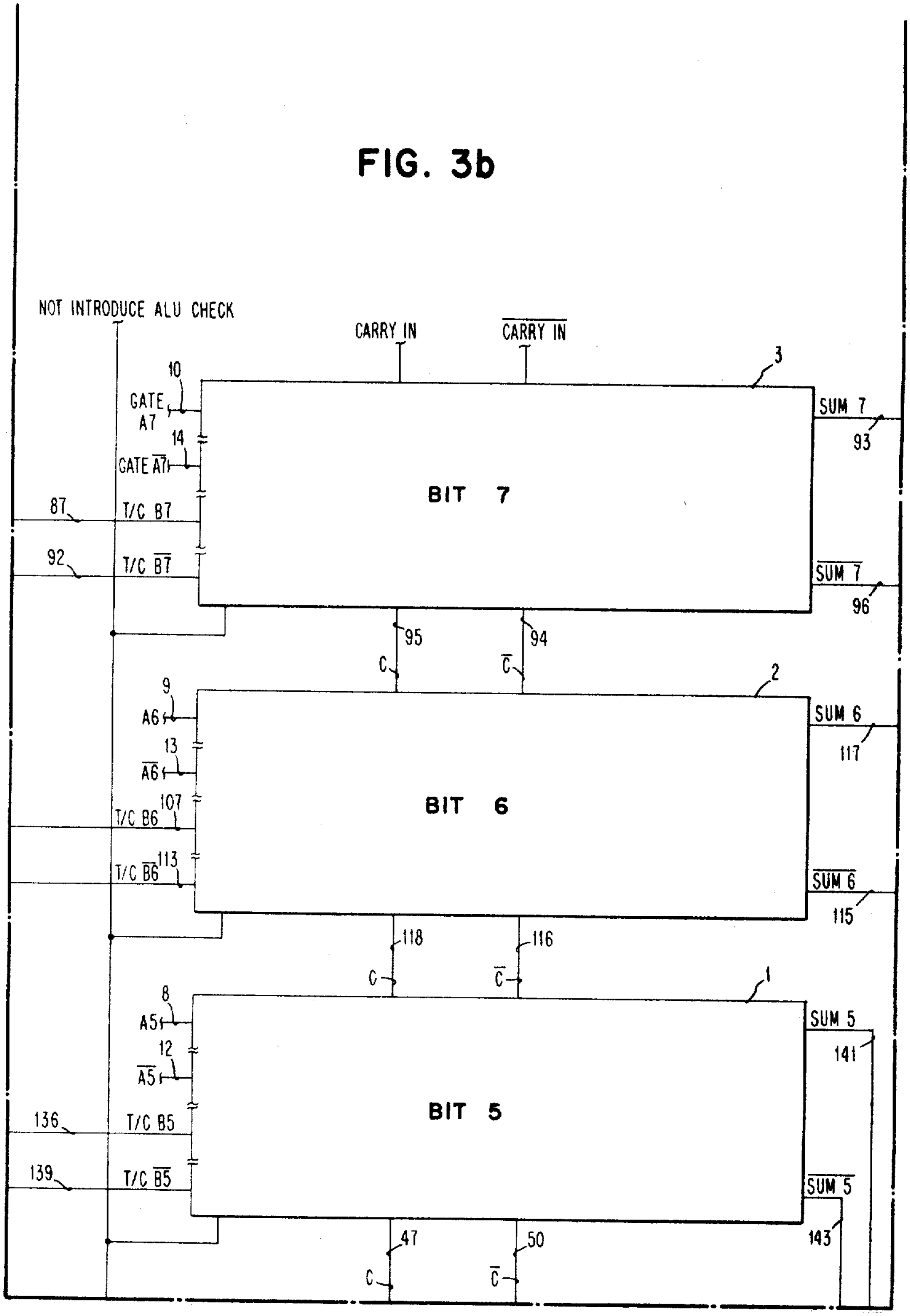
Figure 3C:
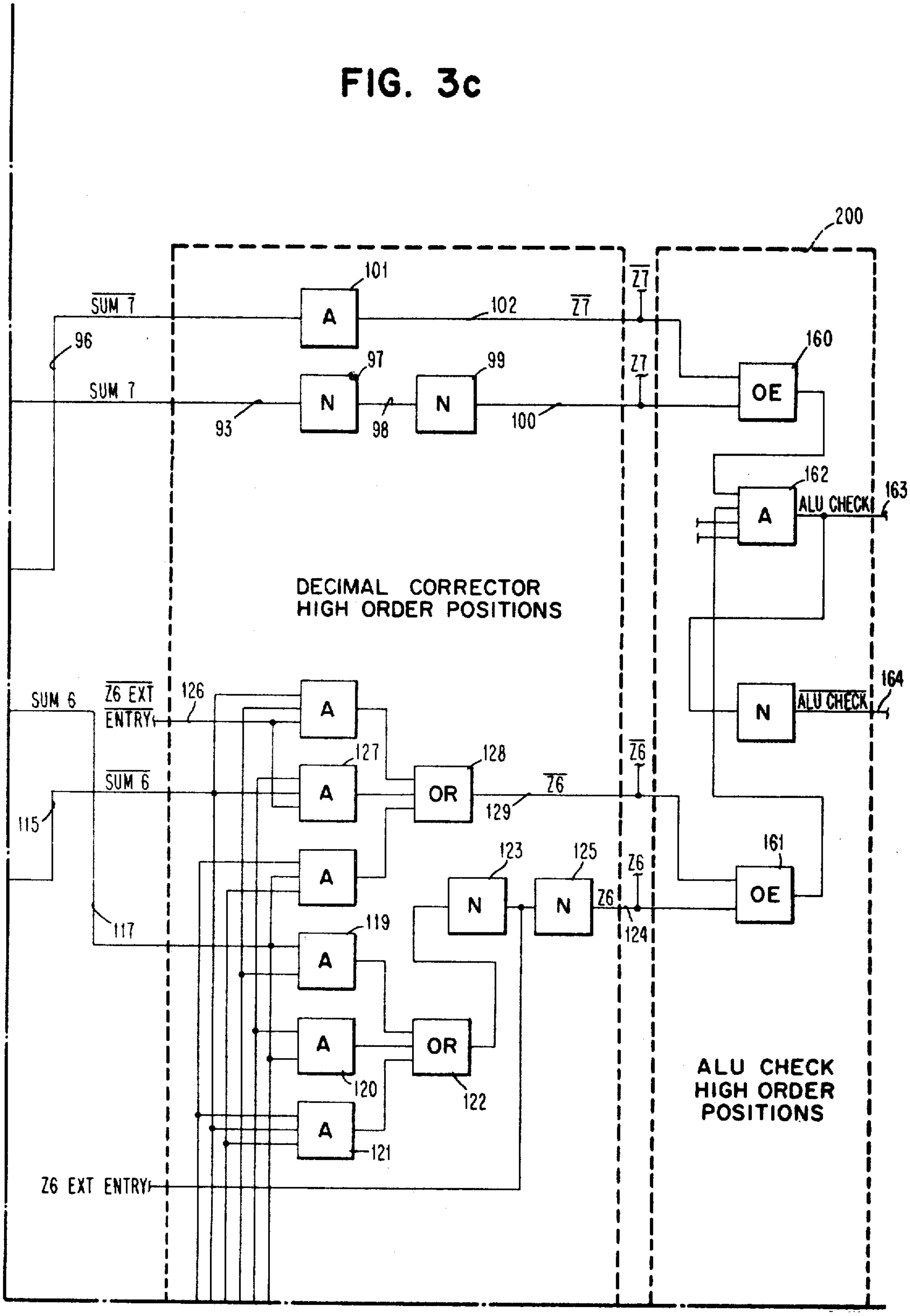
Figure 3D:
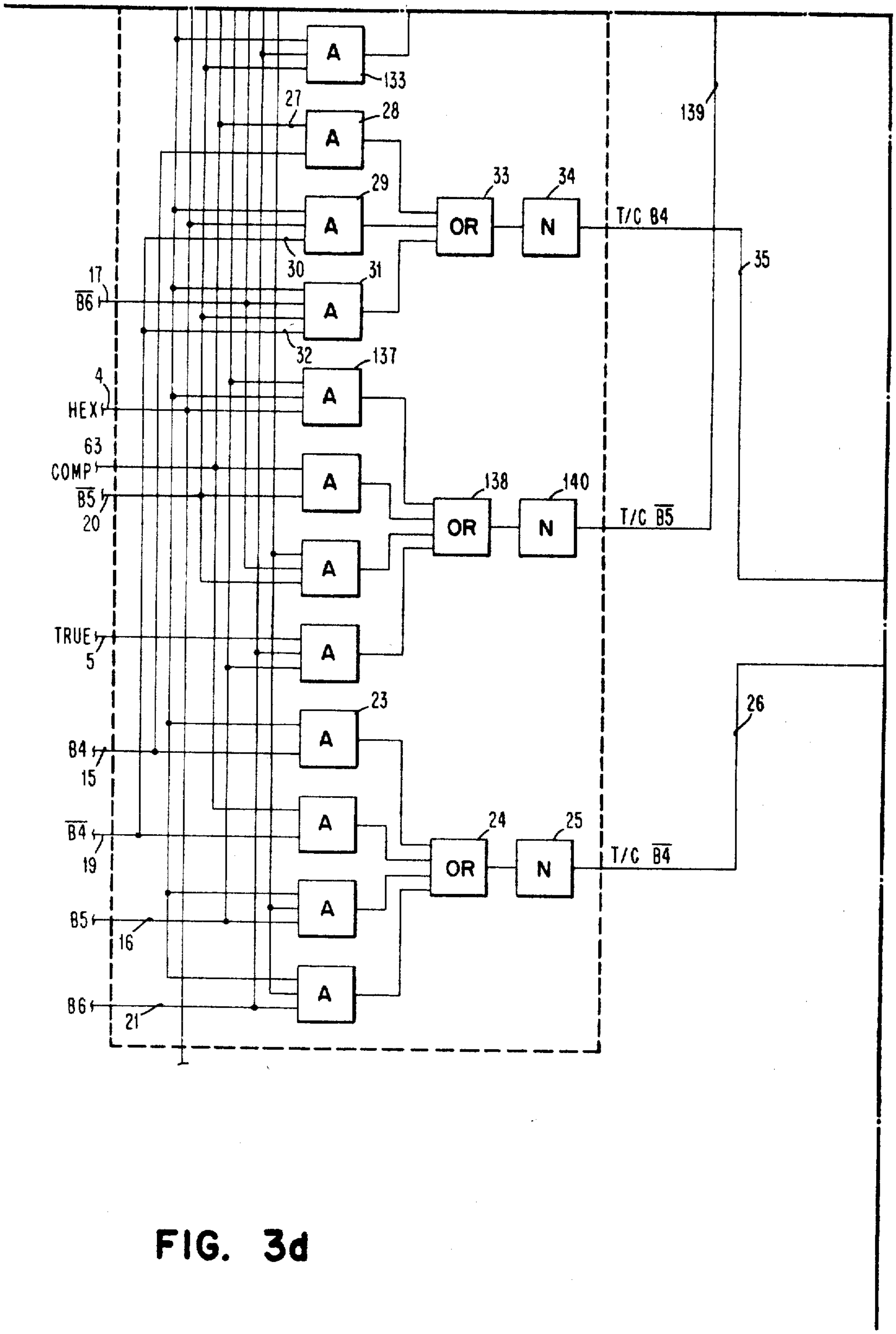
Figure 3E:
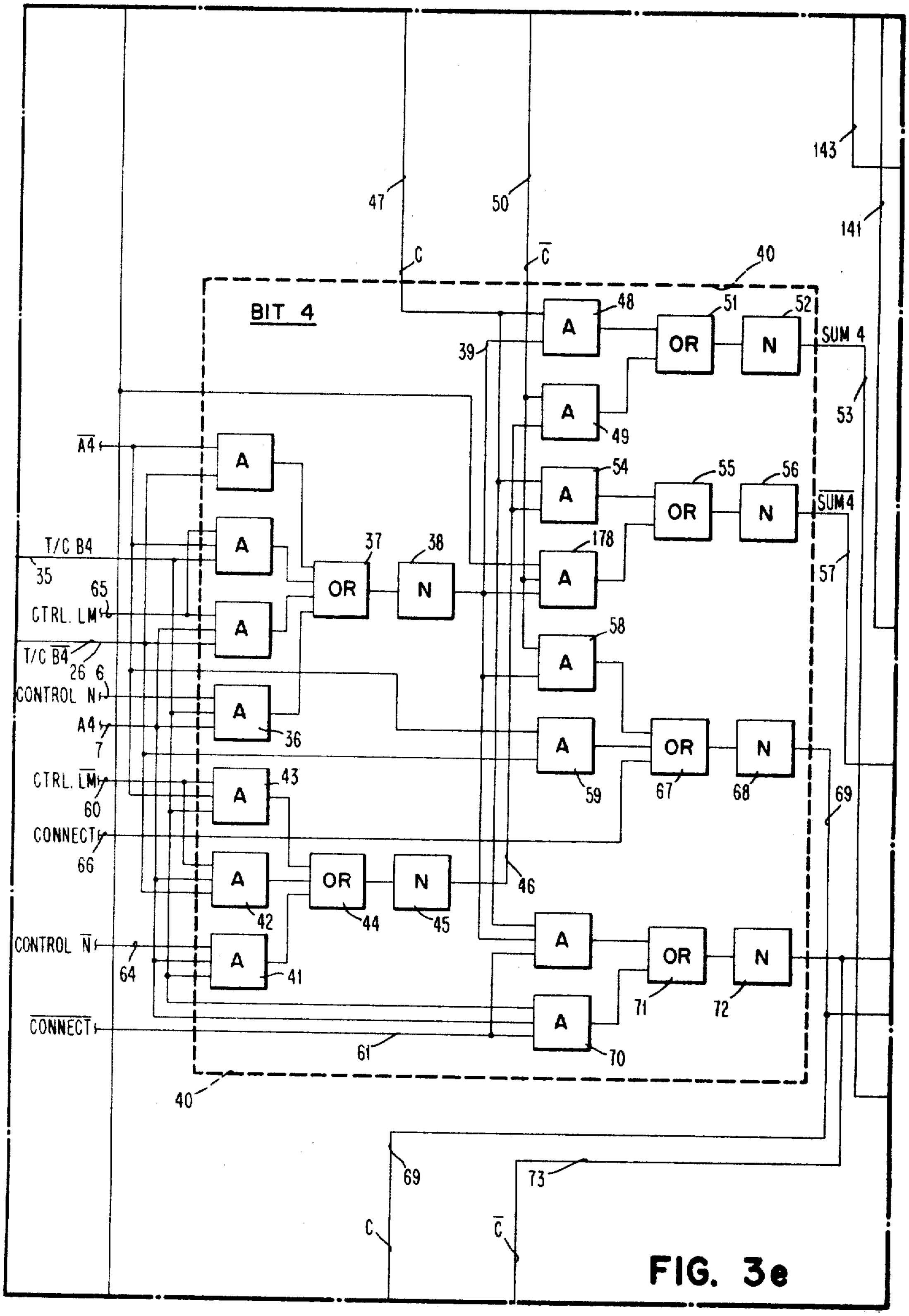
Figure 3F:
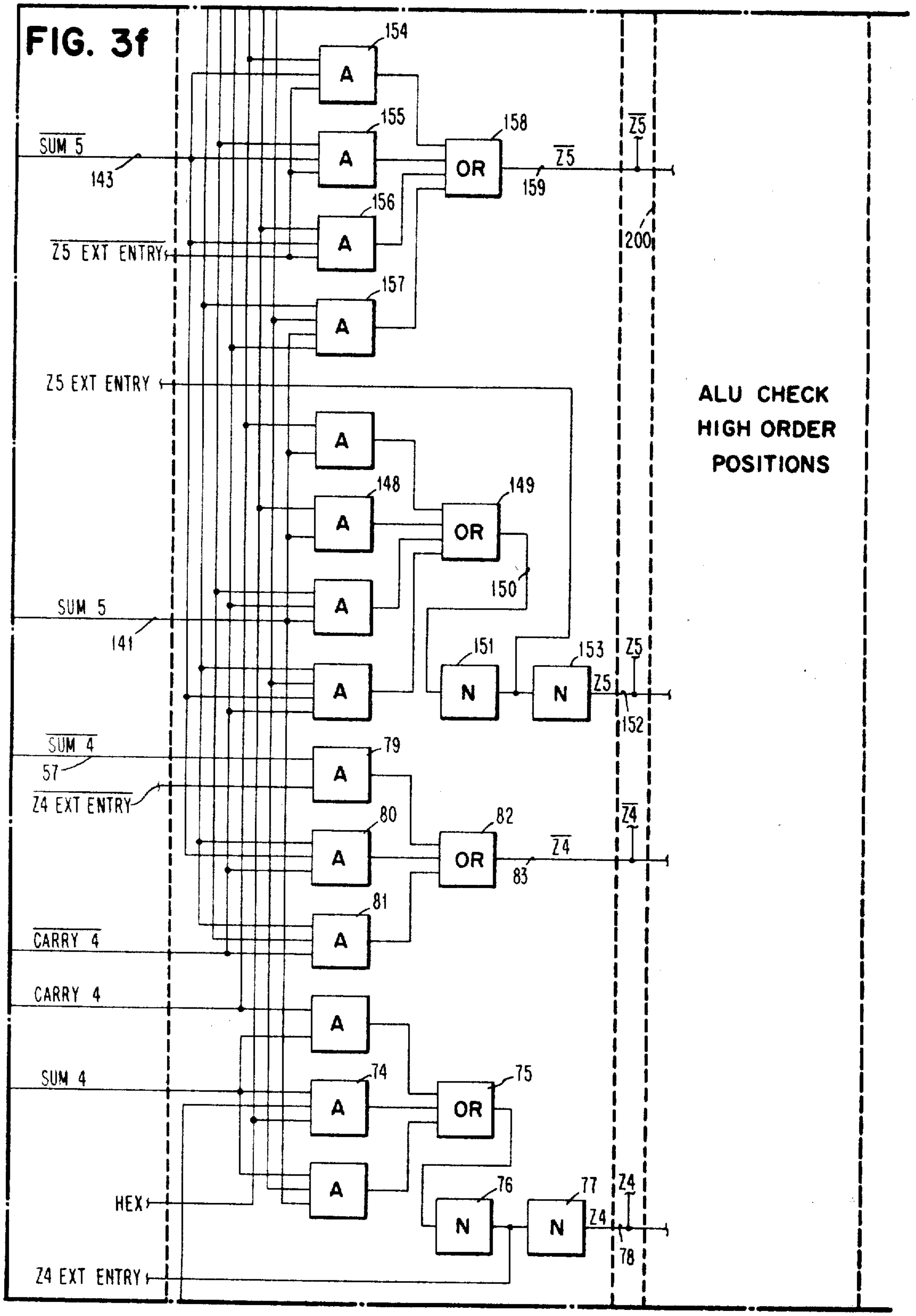
Figure 3G:
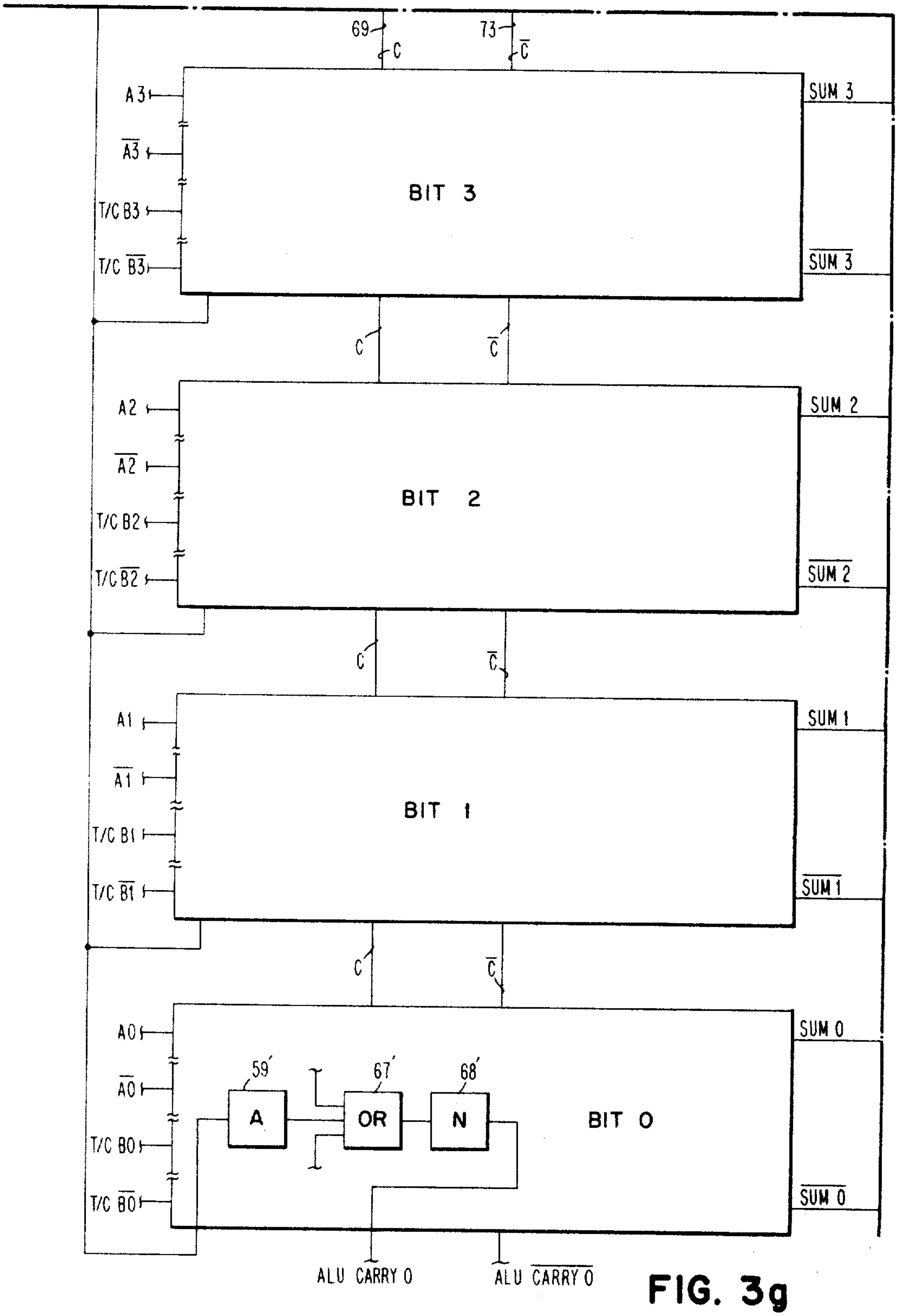
Figure 3H:
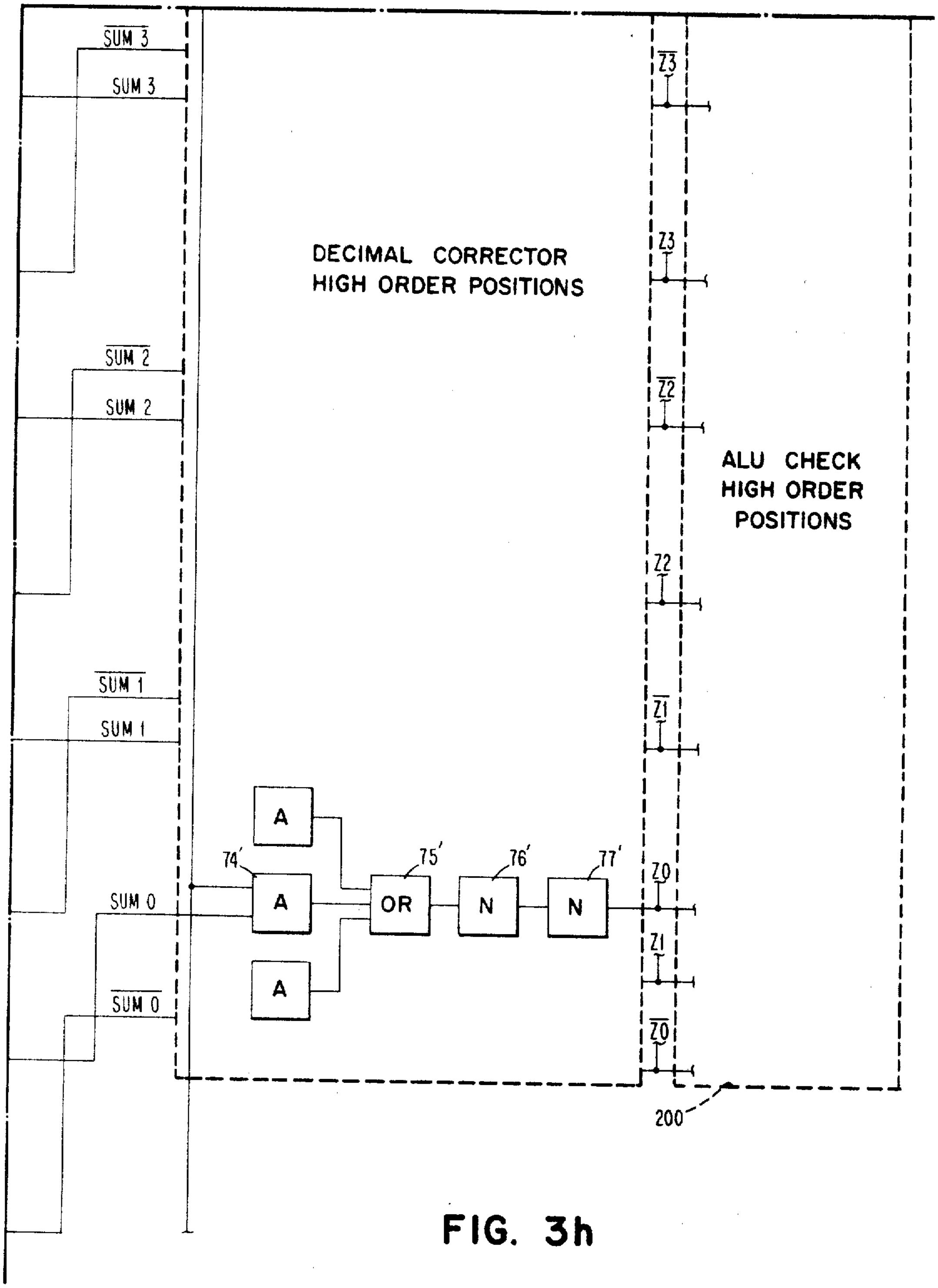

Turning to FIG. 3*h*, the line 213 is shown connected to AND circuit 74' and also to AND circuit 74. In FIG. 3*e*, the line 233 is connected to AND circuit 178, located within the adder circuit for bit 4. Similarly, the line 213 is also connected to corresponding AND circuits, although not shown, within the boxes representing the adder circuits, for bits 1, 2, 3, 5, 6 and 7. The line 233 is also connected to AND circuit 59' in the adder circuits constituting a portion of bit 0, shown in FIG. 3*g*.

Under normal conditions of operation of the ALU; that is, while the latter is undergoing an arithmetic or a logic function, the lines 213 and 223 are at an up level to place these control lines in a quiescent state, so the AND circuits in question are controlled strictly by the remaining inputs thereto. However, when the reliability monitoring operation is called upon in the manner previously described, these reliability control lines are activated by imposing thereon a down level signal to cause the AND circuits in question to force a negative output which is the equivalent of an error condition similar to that which might arise during a normal operation. The forced error condition, during a reliability test, is passed on to the ALU checking circuits which recognize the existence of the forced error condition. The recognition of the forced error condition is evidence of the reliable performance of the ALU checking circuits. The failure of the checking circuits to detect this forced error causes a machine stop which is coupled with a routine for indicating the nature of the failure.

Before attempting a description of the monitoring procedure, it would be appropriate at this point to describe the role of the pertinent AND circuits and the function that each performs in the adder circuits of the ALU during a normal operation, such as a true binary add, which will serve as a basis for a description of the operations of the microprogram monitor routine for effecting the reliability test operation.

ARITHMETIC AND LOGIC UNIT (ALU)

GENERAL

Before describing the true binary add operation, a general description will now be given of the ALU. The ALU performs all types of arithmetic operations; for example, add, subtract, multiply and divide, as well as logic operations, such as AND, OR and EXCLUSIVE OR. A portion of the complete ALU is shown in detail in FIGS. 3*a* through 3*h*. Data is supplied to each of the two ALU operand inputs in the form of a byte of eight binary bits presented in parallel. The bit positions in a byte are numbered, left to right, from 0 to 7, for reference purposes. Bit positions 0, 1, 2 and 3 are referred to as the high-order bit positions of the byte, while bit positions 4, 5, 6 and 7 are referred to as the low-order bit positions. A byte of data presented to either operand to the ALU may represent the operand in 8-bit binary form or it may represent two decimal digits, one digit being represented in binary form in bit positions 0, 1, 2 and 3 of the byte while the other digit is represented in binary form in bit positions 4, 5, 6 and 7 of the data byte. Hence, the ALU is required to operate in either of two modes, binary or decimal, depending upon the form in which the operands are represented. Each time a set of binary bits representing an operand is applied to an input to the ALU, another set of corresponding but inverted binary bit signals is also directed to the ALU so that the ALU performs the desired arithmetic or logic function using the direct bit signals representing the two operands and the same arithmetic or logic function is performed using the inverted bit signals for each operand. Thus, each time the ALU performs an arithmetic or logic function, two results, each in the form of eight parallel binary bits, are developed. The two 8-bit results are directed to a checking circuit where they are compared, and an error signal is developed if the two results are not equal.

In FIG. 3*e*, part of the circuitry for operating on bit 4 of the A and B inputs is shown in detail within dotted line box 40. Corresponding circuitry for operating on bits 5, 6 and 7 for both operands is similar and is schematically represented in FIG. 3*b* by blocks 1, 2 and 3, respectively.

In order to obtain some appreciation of how the various logic components function in the processing of a specific operand bit, the true binary add function will now be described, illustrating how an addition is performed on two operands, with particular emphasis on bits A4 and B4.

In this example, each of the data input lines for the A operand is referred to as A1, A2 . . . A7, corresponding to the 8 bit positions of the 8-bit data byte. Likewise, each of the data input lines for the B operand is referred to as B1, B2 . . . B7. A bar appearing over a signal identification indicates that the subject signal is inverted and has a down level voltage in contrast to a similarly identified signal having no bar thereover and which has an up level voltage. For example, signal $\overline{A2}$ is an inverted A2 signal and is at a down level when the latter, A2, is at an up level.

The ALU is selectively controlled to perform one of the five arithmetic or logic functions previously noted by means of the following control signals: TRUE, COMP., DEC., HEX, LM, $\overline{LM}$, N, $\overline{N}$, CONNECT and $\overline{CONNECT}$. The status of each of these control lines required to perform each of the arithmetic and logic functions is shown in the following table:

| DEC. | HEX | FUNCTION | COMP. | TRUE | CONNECT | $\overline{CONNECT}$ | LM | $\overline{LM}$ | N | $\overline{N}$ |
|---|---|---|---|---|---|---|---|---|---|---|
| ON for DEC. Mode; OFF for Binary Mode. | ON for Binary Mode; OFF for DEC. Mode. | A+B | OFF | ON | OFF | ON | OFF | ON | ON | OFF |
| ON for DEC. Mode; OFF for Binary Mode. | ON for Binary Mode; OFF for DEC. Mode. | A−B | ON | OFF | OFF | ON | OFF | ON | ON | OFF |
| OFF | ON | A and B | OFF<br>ON | ON<br>OFF | ON | OFF | ON | OFF | OFF | ON |
| OFF | ON | A or B | OFF<br>ON | ON<br>OFF | ON | OFF | OFF | ON | OFF | ON |
| OFF | ON | A or B but not A and B | OFF<br>ON | ON<br>OFF | ON | OFF | OFF | ON | ON | OFF |

*Example of a binary true add operation*

Referring to FIGS. 3*d* and 3*e*, in the binary true add operation in which the operands A and B are each represented as the data inputs to the ALU in 8-bit binary form, the signal on each of the following control lines is at an up voltage level, as indicated by the preceding table: 4 (HEX), 5 (TRUE), 6 (N), 60 ($\overline{LM}$) and 61 ($\overline{CONNECT}$). The signal on each of the following control lines is at a down level, as indicated by the preceding table: 62 (DEC), 63 (COMP), 64 ($\overline{N}$), 65 (LM) and 66 (CONNECT). For the purpose of explaining the add operation, it is assumed that the A operand is 01011101 for bits A0 through A7 and that the B operand is 10001100 for bits B0 through B7. Since the operation of the ALU in adding the four high-order bits of the operands is similar to its operation for adding the four low-order bits of the two operands, it will suffice to describe how the ALU operates to add the four low-order bits 4 through 7 of both operands, respectively 1101 and 1100.

Referring to FIGS. 3*a* through 3*h*, bit lines 7 (A4), 8 (A5), 10 (A7) and 13 ($\overline{A6}$) are each at an up level while lines 11 ($\overline{A4}$), 12 ($\overline{A5}$), 9 (A6) and 14 ($\overline{A7}$) are each at a down level as a result of the A operand input signals. Lines 15 (B4), 16 (B5), 17 ($\overline{B6}$) and 18 ($\overline{B7}$) are at an up level whereas lines 19 ($\overline{B4}$), 20 ($\overline{B5}$), 21 (B6) and 22 (B7) are at a down level as a result of the B operand input signals.

The most significant bit (bit 4 of the A operand) is a binary "1" (A4) which enters the ALU on line 7. This bit is added as follows to the binary "1" bit on line 15, which is the corresponding position B4 of the B operand.

Since the two inputs (B4 and TRUE) to AND circuit 23 (FIG. 3*d*) are up, the output of OR circuit 24 is up, and thus inverted by means of inverter 25 to pass a down level on line 26 (T/C $\overline{B4}$). The output of AND circuit 28 is down since the signal COMP on line 27 is down. The output of AND circuit 29 is also down because the signal $\overline{B4}$ on line 30 is down. Since the signal $\overline{B4}$ on line 32 is down, this provides a down level on the output from AND circuit 31. Since all of the inputs to OR circuit 33 are down, the output of inverter 34 on line 35 (T/C B4) is thus at an up level.

Since the signal on each of the lines 6 (N), 7 (A4), and 35 (T/C B4) is up, the output of AND circuit 36, which serves as one input to OR circuit 37, is up, thus bringing the output of inverter 38 on line 39 to a down level. As will be pointed out under the checking circuits to be later described, this down level at the output of inverter 38 is communicated to AND circuit 178 which provides a down level output to OR circuit 55. However, as will be shown in the ensuing description, a positive output from AND circuit 54 takes precedence over the down level supplied by the output of the AND circuit 178, causing the latter to issue an up level output which is inverted to a down level by inverter 56, and which down level is communicated to line 57, referenced as the $\overline{SUM\ 4}$ output. Since the signal on the line 64 is down, the output from AND circuit 41 is also down. The signal on line 26 (T/C $\overline{B4}$) is down and provides a down level on the output from AND circuit 42. The signal on line 11 ($\overline{A4}$) is down; hence, the output from AND circuit 43 is also down. Since all inputs to OR circuit 44 are down, its output is down and, in view of inverter 45, line 46 is provided with an up level.

In a similar manner, addition of the next lower order bit (A5) of the A operand (binary "1" signal applied to line 8) to the corresponding order bit (B5) of the B operand (binary "1" signal applied to line 16) causes the signal on carry line 47 (FIG. 3*e*) to be up and the signal on not-carry line 50 to be down.

The output of AND circuit 48 is down in view of the signal on line 39 being down, as set forth above. The output of AND circuit 49 is also down because of the down signal on line 50 ($\overline{C}$). Since all input signals to the OR circuit 51 are down, the output of this OR circuit is fed through inverter 52, which provides an up level signal on line 53, the sum 4 line.

Since both the signal on line 47 (C) and the signal on line 46 are up, the output of AND circuit 54 is up and passes through OR circuit 55 and inverted by means of inverter 56 to provide a down level on line 57 ($\overline{\text{SUM 4}}$).

Since lines 46 and 50 are at a down level, the output from AND circuit 58 is also down. The output from AND circuit 59 is down because the signal on line 11 is down. The signal on line 26 (T/C $\overline{\text{B4}}$) is also down. Since the output from both AND circuits 58 and 59 is down and since the signal on line 66 is down, the output from OR circuit 67 is down, inverted by inverter 68 to place an up level on line 69 (CARRY 4).

Since the signals on lines 61 ($\overline{\text{CONNECT}}$), 7 (A4) and 35 (T/C B4) are up, all inputs to the AND circuit 70 are up, the output of OR circuit 71 is also up, and then inverted by inverter 72 to provide a down level on line 73 ($\overline{\text{CARRY 4}}$). Since the signal on line 4 (HEX) is up and the signal on line 53 (SUM 4) is up, the output signal from AND circuit 74 (FIG. 3*f*), which serves as one input to OR circuit 75, is also up. Since the output signal from the OR circuit 75 is up, the output signal on the line 78 (Z4) is also up in view of a double inversion caused by inverters 76 and 77.

The signal on line 57 ($\overline{\text{SUM 4}}$) is down; hence, the output from AND circuit 79 (FIG. 3*f*) is also down. AND circuit 80 is also down because the signal on line DEC is down. AND circuit 81 is down because the signal on line 73 ($\overline{\text{CARRY 4}}$) is down. Since none of the input signals to OR circuit 82 is up, the output from OR circuit 82 on line 83 ($\overline{\text{Z4}}$) passes a down level.

It has now been described how, in the specific problem assumed (addition of 01011101 to 10001100), a binary "1" is developed in the highest order of the four low-order bits of the sum (bit position 4 of the 8-bit sum byte). This binary "1" sum bit is represented by the up signal Z4 on line 78. The signal on the corresponding complementary sum bit line 83 ($\overline{\text{Z4}}$) has been shown to be at its down level. Furthermore, the up signal on carry line 69 (CARRY 4) and the down signal on not-carry line 73 ($\overline{\text{CARRY 4}}$) provide a carry to the next higher order bit position.

Continuing, since the signals on lines 5 (TRUE) and 18 ($\overline{\text{B7}}$) are up, the output from AND circuit 84 is also up to cause an up level at the output from OR circuit 85. This output is inverted by means of inverter 86 to provide a down level on line 87 (T/C B7). The signal on line 22 (B7) is down to place the output from AND circuit 88 at a down level. The signal on line 63 (COMP), FIG. 3*d*, is down; hence, the output from AND circuit 89 is also down. Since all input signals to OR circuit 90 are down, the output signal of OR circuit 90 is down and inverted by means of inverter 91 to place an up level on line 92 (T/C $\overline{\text{B7}}$). Circuitry represented by block 3 (for bit 7), which is similar to the circuitry in block 40 (for bit 4), utilizes the up signals on lines 10 (A7) and 92 (T/C $\overline{\text{B7}}$) and the down signals on lines 14 ($\overline{\text{A7}}$) and 87 (T/C B7) to develop an up signal (sum bit) on the line 93 (SUM 7) and an up signal (no-carry signal) on line 94 ($\overline{\text{C7}}$). Down signals are developed on lines 95 (C) and 96 ($\overline{\text{SUM 7}}$).

Since the signal on line 93 (SUM 7) is up, an up level is placed on line 100 in view of inverters 97 and 99. This up level signal on line 100 (Z7) represents a binary "1" in the lowest order of the 8-bit sum. The signal on line 96 ($\overline{\text{SUM 7}}$) is down, so the output of AND circuit 101 on line 102 is also down and passed on to line 102 ($\overline{\text{Z7}}$), the complement of the signal on line 100 (Z7).

Since the lines 17 ($\overline{\text{B6}}$), 4 (HEX) and 5 (TRUE) are each at an up level, the signal at the output of AND circuit 103 is also up. Hence, the output signal from OR circuit 106 is up and the signal on line 107 (T/C B6) from the inverter 108 is down.

Since the signal on line 21 (B6) is at a down level, the output signal from AND circuit 109 is also down. Since the signal on line 63 (COMP) is down, the output signal from AND circuit 110 is also down. The output signal from AND circuit 111 is down because the signal on line 62 (DEC) is down. The output signal from OR circuit 112 is down because all input signals to the circuit are down, then inverted by inverter 14 to provide an up level on line 113 (T/C $\overline{\text{B6}}$).

With the signals on lines 13 ($\overline{\text{A6}}$), 113 (T/C $\overline{\text{B6}}$) and 94 ($\overline{C}$) at an up level and the signals on lines 9 (A6), 95 (C) and 107 (T/C B6) at a down level, circuits represented by block 2, similar to the circuits shown in block 40, function to produce up level signals on lines 105 ($\overline{\text{SUM 6}}$) and 116 ($\overline{C}$) and down level signals on lines 117 (SUM 6) and 118 (C).

A down level signal on line 117 (SUM 6) causes a down level output from both AND circuits 119 and 120; and, since the signal on line 62 (DEC) is down, the signal at the output of AND circuit 121 is also down. All input signals to OR circuit 122 being down, the output of OR circuit 122 is down, and inverted via inverter 123 to place an up level on line 124 and inverted again by inverter 125 to provide a down signal on line 124, representing a binary "0" in the next-to-the-lowest order of the sum.

Since each of the signals on lines 4 (HEX), 115 ($\overline{\text{SUM 6}}$) and 126 ($\overline{\text{Z6 EXT. ENTRY}}$) is at an up level, it follows that the output from AND circuit 127 also develops an up level; and, for the same reason, the output signal from OR circuit 128 on line 129 is also at an up level and represents the complement of the signal on the line 124.

Since the signal on line 20 ($\overline{\text{B5}}$) is down, the output from AND circuit 130 is also down. Line 63 (COMP), being at a down level, provides a down level at the output of AND circuit 131. AND circuit 132 provides a down level because the signal on line 62 (DEC) is down. AND circuit 133 is down because the signal on line 20 ($\overline{\text{B5}}$) is down. In view of these down level signals, OR circuit 134 provides a down level which is inverted via inverter 135 to provide an up level signal on line 136 (T/C B5).

Since each of the lines 16 (B5), 5 (TRUE) and 4 (HEX) is at an up level, AND circuit 137 and OR circuit 138 pass an up level which is inverted by means of inverter 140 to provide a down level on line 139 (T/C $\overline{\text{B5}}$). With the signal on each of the lines 8 (A5), 136 (T/C B5) and 116 ($\overline{C}$) at an up level and the signal on each of the lines 12 ($\overline{\text{A5}}$), 139 (T/C $\overline{\text{B5}}$) and 118 (C) at a down level, logic circuitry represented by block 1 functions to develop up level signals on lines 143 ($\overline{\text{SUM 5}}$) and 47 (C) and down level signals on lines 141 (SUM 5) and 50 ($\overline{C}$).

Because the signal on line 141 (SUM 5) is down (and for other reasons not pertinent here), outputs of all AND circuits feeding OR circuit 149 are necessarily down and, because of inverter 151, an up level is passed on line 150. By virtue of inverter 153, a down level signal is presented to line 152 and represents a binary "1" in the third bit position of the sum. The up signal on line 47 represents a carry to the next higher order position of the ALU, as shown in block 40. With $\overline{\text{Z5 EXT. ENTRY}}$ up, AND circuit 156 will produce an up signal (Z5) on line 159.

It has now been described how the low-order four bits of the sum are developed by the ALU during a binary true add operation when the A operand is 01011101 and the B operand is 10001100. The high-order four bits of the sum are similarly developed by the other half of the ALU circuits.

*ALU checking circuits*

The result of the ALU operation is checked by checking means 200. The signal on each of the ALU output lines 100 (Z7), 124 (Z6), etc., is directed to one input of an EXCLUSIVE OR circuit, such as 160 and 161. To the second input of each of these EXCLUSIVE OR circuits is directed the ALU complementary output signal on lines 102 ($\overline{Z7}$), 129 ($\overline{Z6}$), etc., which corresponds to the first input signal. Although EXCLUSIVE OR circuits for only the two lowest order bit positions of the ALU output are shown, it is to be understood that EXCLUSIVE OR circuits are also provided and similarly connected at the remaining bit positions of the ALU output. The output from each of the eight EXCLUSIVE OR circuits in checking means 200 is directed to one input of AND circuit 162.

Proper operation, during normal operations, of the ALU results when one of the two input signals to each of the eight EXCLUSIVE OR circuits 160, 161, etc., is at an up level and the other input signal is at a down level. As a result, each of these EXCLUSIVE OR circuits provides an up level output into AND circuit 162, the latter providing an up level to ALU check line 163. The signal (not ALU check) on line 164 is down, since it is the inverted output of AND circuit 162. When the input conditions to any one of the EXCLUSIVE OR circuits is not satisfied, a negative output is issued by the EXCLUSIVE OR not satisfied; as a result, the output line 163 will be at a down level and the signal on line 164 will be at an up level to provide an error indication in an MC register, shown in FIG. 1.

During a reliability test, both inputs at each EXCLUSIVE OR circuit are raised to an up level to provide an error condition which forces the checking circuits to indicate an error. If, for any reason, the checking circuits do not indicate an error under these forced conditions, an appropriate indication is given that the checking circuits are at fault.

Since a portion of the reliability test is assigned to test the decimal corrector of the ALU, a description of a decimal true add operation is presented to show the functions performed by pertinent AND circuits in the decimal corrector.

*Decimal true add operation of the ALU*

In decimal operation of the ALU, the data byte of eight binary bits presented to each of the two operand inputs to the ALU represents two decimal digits in binary coded form. The four high-order bits in each operand represent one digit in binary form, while the four low-order bits in each operand represent the next lower order decimal digit. The eight binary bit ALU output likewise represents two decimal digits.

The ALU is basically a binary adder. When the ALU is used as a decimal adder, six (0110) is added to each 4-bit digit of the B operand and the two operands are then added as in a binary add operation. This use of "excess-6" on the B entry to the ALU in decimal operations results in the logic expression for the decimal carry being the same as for binary operation's carry and permits the binary adder to perform decimal operations without the need for it being changed. After the two groups of four bits of the A operand are added in parallel to the two corresponding groups of four bits in the B operand, and, in each case where the addition of a 4-bit group in the A operand to the corresponding 4-bit group in the B operand does not result in a carry, a six is subtracted from the result of the addition of the respective two 4-bit groups. If a carry does result from the addition of two 4-bit groups, no six is subtracted from the result and it is applied directly to the ALU output bus.

The ALU is made to operate in the decimal mode, as opposed to the binary mode, by bringing up the control signal DEC on line 62 and putting down the control signal HEX on line 4. Other control signals to the ALU have the same status for performing a given operation regardless of whether the ALU is to operate in the decimal or binary mode. Thus, for a true add operation in the decimal mode, the signal on line 62 (DEC) will be up and the signal on line 4 (HEX) will be down while the signals on each of the other ALU control lines will be at the same level as previously described for a binary true add operation.

The foregoing description of the ALU and the examples for performing add operations in binary and in decimal will serve as a basis for understanding the operations concerned with how the reliability test circuits perform under a monitor program routine constituted of a series of microprogram steps each defining a precise computer step of operation. In the course of these descriptions, it was mentioned, among other things, how the reliability control line 233 acquired a quiescent level and the connection of this line to one input of the AND circuit 178, shown in FIG. 3*e*. It was further mentioned how the second input to AND circuit 178 was controlled by AND circuits 174, 175, 176 and 36 and the development of a down level signal on the $\overline{\text{SUM 4}}$ line 7. In accordance with the ensuing explanation under microprogram operations, a down level signal applied to the reliability control line 233 activates the latter and enables the AND circuit 178 to supply a down level, which is inverted by inverter 156, to supply an up level on the $\overline{\text{SUM 4}}$ line 7. For reasons to be explained under the ensuing description, it will also be shown how the SUM 4 line 153 will be conditioned to an up level. As a result of both the SUM 4 line and the $\overline{\text{SUM 4}}$ line being at an up level, the conditions at the inputs to the EXCLUSIVE OR circuit in the checking circuit will be such that the output of the corresponding EXCLUSIVE OR circuit will be at a down level for the ALU check line 163 and an up level on the $\overline{\text{ALU check}}$ line 164. By virtue of this condition, an error signal is developed in the manner set forth in the description under ALU checking operations.

As a preliminary to an explanation of the microprogram routine for carrying out a reliability test operation of the ALU check circuits, it might be well to refer to an explanation of the meaning of microprogram statements generally employed to carry out all steps of computer operations. This explanation may be found on pages 519 through 527 in connection with FIG. 3 of the aforementioned application Ser. No. 357,372. In general, however, the statements most commonly used in the present application relate primarily to the functions performed by the ALU and are concerned primarily with data fed from the A bus and the B bus into the ALU and transmitted therefrom through the Z bus to a destination register; for example, any one of the registers L, D, R and S, seen in FIG. 1. As an introduction, however, a brief explanation of one statement in the present application, not found in the aforementioned application, will be made. Consider the statement "$L=\phi+K1L$," which statement is used in the sixth microprogram block, having an address of 006, and seen in FIG. 4*a*. This statement is interpreted as follows. The symbols to the left of the equal sign specify a destination which usually communicates with the Z bus and which reflects the output of the ALU. In the present example the symbol L designates the L register, seen in FIG. 1, and communicates with the Z bus. The expression to the right of the equal sign sets forth data transmitted through the A bus and the B bus, the nature of the data, and the manner in which the ALU is controlled to process this data. In the present example, the expression "$\phi+K1L$" means that zeros are transmitted by way of the A bus into the ALU and the "K1L" portion of the expression means that a constant is transmitted to the ALU by way of the B bus. The plus symbol in the expression sets up the proper controls in the ALU for an arithmetic add function.

Statements not explained in the aforementioned case, which are concerned with the present invention, will be described in the ensuing description.

The microprogram routine for the reliability test is initiated by setting the appropriate address selecting switches B, C and D, schematically shown in FIG. 1, on the console under the control of an operator. In general, the ALU reliability test is performed in the following manner. Referring to FIG. 2*a*, the Z bus 0 output and the Z bus 4 output lines are tested first, in the order named, with the ALU section being conditioned for a binary logic function. Next, the eight Z bus output lines are tested in sequence in eight successive sequential loop operations, with the ALU section being conditioned for a binary logic operation, following which the SUM 0 and the SUM 4 output lines are tested, with the ALU section being conditioned for a decimal add with the true/complementary latch set to complementary function. Finally, the last operation tests the effectiveness of the carry operation, with the ALU section being set to a straight binary add operation.

As seen in FIGS. 4*a* and 4*b*, 29 microprogram steps are utilized to test the effectiveness of all ALU output circuits. Twenty-three of these microprogram steps, 001 through 023, are assigned to carry out the test functions explained; and six microprograms, designated 103, 107, 111, 115, 119 and 123, are used to cause a stop operation in the event a failure develops in the circuit being tested.

The first three microprogram steps 001, 002 and 003 are employed to test the Z bus output line, bit position 0. The next three microprogram steps 004, 005 and 006 are assigned to test the Z bus output line for bit position 4. Microprogram steps 007, 008, 009, 010 and 011 form a loop, and each pass through the loop will test one of the Z bus output lines so that, to test the effectiveness of the eight output lines for the bits 0 through 7, eight passes through the loop are necessary. Microprogram steps 012, 013, 014 and 015 are assigned to test the effectiveness of the no-carry check. Microprogram steps 016, 017, 018 and 019 are assigned to test the effectiveness of the SUM 0 output line and, finally, microprograms 020, 021, 022 and 023 are assigned to test the effectiveness of the SUM 4 output line.

The first test operation calls for testing the Z bus output line for bit position 0, seen in FIG. 2*b*. In FIG. 4, it is shown that three microprogram steps having addresses 001, 002 and 003, respectively, are utilized to carry out this phase of the test operation. The first microprogram step address 001, sets forth two statements, "$OE=1$" and "$Z=\phi\forall K8H$." The first statement, as previously explained, provides the circuitry for energizing the odd/even latch 201, shown in FIG. 1. This is accomplished by the pattern of microprogram signals issued by the SAL's of the read-only storage which produce the constant 8 that enables the K8 AND circuit to provide an up level signal on the line K8*a* that turns on the odd/even latch 201. As a result, the control line 213 is placed at a down level. This down level is supplied to the decimal corrector in the manner explained that raises the $\overline{Z0}$ line shown connected to the ALU check circuit 200, seen in FIG. 3*h*. The second statement calls for testing the output of the Z bus bit position 0 by virtue of the following operation. The A bus is controlled to supply zeros to the A input of the adder by way of the A register at the same time that the B bus transmits a constant binary 8(1000) to the B entry of the adder. At the same time, the adder is controlled to perform an EXCLUSIVE OR logic function. The constant 8 is admitted to the B bus by way of the K bus line through a constant selector K. SEL. and through a K bus gate controlled by a K*c* read-only storage control signal. This constant selector is settable to admit values of eight and one. As a result of this logic function, a down level signal is imposed on the $\overline{Z\phi}$ line as well as a down level on the $Z\phi$ line caused by line 213 from odd/even latch 201. This set of input conditions to the EXCLUSIVE OR circuit results in a forced error to cause the ALU check line 163 to a down level and the line 164 to an up level. Microprogram step address 002 contains two statements; namely, "LOAD" and "$Z=MC\forall K8L$." The statement, "LOAD," is enabled by a pattern of microprogram signals, among which are developed a constant 13. The constant enables the K13 AND circuit to provide an up level on line **13*a* which turns off the odd/even latch 201. Under this condition, both control lines 213 and 233** are each at an up level. The second statement is provided to test the MC register, position bit 4. This is accomplished by applying the contents of the MC register to the A bus and the contents of the K field low-order positions a binary 8(1000) and setting up the ALU for an EXCLUSIVE OR function. As a result of this, the Z bus position 4-bit line will have a down level to indicate a 0. The purpose of this is to be able to branch on this error condition on the next microprogaam step; namely, step address 003. This step contains two statements; namely, "$Z=\phi$" and "$MC=\phi$." The first statement is a branch on error condition which would cause the microprogram routine to branch to address 103 should the checking circuits fail to respond at this time. The second statements sets forth a resetting condition to reset the contents of the MC register to zero. The above three microprogram steps set forth the manner in which the check circuits are tested for the bit 0 position.

The next phase of the operation utilizes microprogram address steps 004, 005 and 006 to test the checking circuits related to or concerned with the bit 4 position. Microprogram step 004 is similar to that described for microprogram step 001 except that the constant 8 is now admitted to bit position 4 rather than bit position 0. Otherwise, the steps and the ALU functions are similar; that is, the odd/even latch is turned on and the Z bus bit position 4 is checked. Microprogram step address 005 is identical to the operations described for microprogram step address 002. Microprogram step address 006 sets forth three statements; namely, "$Z=\phi$," "$MC=\phi$" and $$\text{"}Z=\phi+K1L\text{"}$$

The first statement causes a branch on error should the checking circuits fail during the reliability test. The second statement calls for resetting the MC register to zero in the manner previously described. The third statement sets up the adder section of the ALU to perform a binary add operation during which zeros are admitted by way of the A entry into the ALU adder. The constant 1 (0001) is admitted by way of the B entry into the ALU adder. The purpose of this binary add operation is to place the contents of 1 in the L register. Referring to FIG. 1, the contents, as a result of the binary add operation, pass through the Z bus and enter the L register under the control of $Z_2$ gate in turn controlled by a read-only storage control signal $Z_{2a}$.

The following test operation is concerned with testing the checking circuits for each of the eight Z output lines, bits 7 through 0. This phase of the operation is controlled by microprogram steps, addresses 007, 008, 009, 010 and 011. As noted in FIG. 4*b*, these five microprogram steps constitute a loop which will be utilized for eight successive passes in order to test on each pass the eight output bit lines constituting the Z bus. Referring to microprogram step address 007, it is noted that this microprogram step contains a single statement; namely, "$OE=1$." As previously described, this step calls for setting up the odd/even latch in the manner previously set forth. The next microprogram step address 008 contains two statements; namely, "$OE=1$" and "$Z=\phi VL$". The statement, "$OE=1$," is repeated a second time, the last previous statement occurring in step 007, without an intervening reset. This results in the turning on of the ALU check latch with the odd/even latch remaining on to provide down level signals on both the reliability control lines 213 and 233 to introduce forced errors on the input to the adder bit circuits for bits 7 through 0, on eight successive passes through the loop. However, on the first pass, the 7-bit line will be checked. The second statement sets forth an ORing function in the ALU adder during which zeros are admitted by way of the A entry and the contents of the L register admitted by way of the B entry. The result of this logical functions is to test the bit 7 line on the Z bus under control of the reliability circuits in the manner previously described.

The third microprogram step address 009 contains two statements; namely, "LOAD" and "$Z=MC \forall K8L$." These two statements are similar to those described under microprogram step address 002, the purposes of which are to reset the ALU check latch 220 and the odd/even latch 201 and to test the bit 4 position of the MC register. The fourth microprogram step in this loop; namely, address 010, sets forth two statements; namely, "$Z=\phi$" and

"$Z=L+L$"

The first statement calls for a branch on error condition and is the same as that described under microprogram step address 003. The second statement,

"$Z=L+L$"

calls for a test of the carry out from the high-order position of the adder; namely, bit position 0. However, at this time, since the carry is only occurring from the bit position 7, into bit position 6, the step is not effective. The fifth microprogram step address 011 sets forth three statements; namely, "AC," "$MC=\phi$" and

"$L=L+L$"

The first statement, "AC," is a branch on carry should the carry develop from the output of the 0 bit position. However, this will not develop until the eight pass through this loop of five microprogram steps. The second statement, "$MC=\phi$," calls for resetting the MC register in the manner previously set forth. The third statement,

"$L=L+L$"

calls for a binary add operation during which the contents of the L register are admitted to both the A and B entries into the adder and the sum is transmitted through the Z bus and into the L register. Entries from the L register to the A and B buses are under control of gates $A_2$ and $B_2$ controlled respectively by read-only storage signals $A_{2a}$ and $B_{2a}$, seen in FIG. 1. The output of the adder during this binary add operation is transmitted by way of the Z bus into the L register under control of read-only storage control gate $Z_2$ in turn controlled by control signal $Z_{2a}$. The purpose of this doubling operation is to obtain a shift to the left via a carry so as to test the next high-order bit position, bit position 6. On each pass through the loop during microprogram step address 011, the doubling occurs to produce a left shift which eventually, on the eighth pass through the loop, issues a carry from the highest order bit position 0. As above stated, eight passes through the loop are necessary to test all the checking circuits; and, during the eighth pass, a carry from the highest order bit position 0 will cause a branch to microprogram step address 012.

This microprogram step contains statement "$OE=1$," which, as previously described, sets the even latch to its on state.

The next microprogram step address 013 sets forth two statements; namely, "$OE=1$" and "$Z=\phi+\phi$." The first statement, being the second of two successive signals, sets on the ALU check latch 220, the the odd/even latch 201 remaining in its on state. The result of this is to condition the reliability control lines 213 and 233 to their active or down level states so as to set up the forced error conditions in the ALU. The statement, "$Z=\phi+\phi$," is utilized to test the check circuits for the carry operation from the highest order position bit 0. During this operation zeros are admitted to the ALU by way of the A and B entries.

The next microprogram step address 014 contains two statements; namely, "LOAD" and "$Z=MC \forall K8L$." These two statements have been previously described under microprogram step 002 and call for the resetting of both latches 201 and 220 and the testing of the MC register bit 4 position.

The next microprogram step address 015 contains three statements; namely, "$Z=\phi$," "$MC=\phi$" and "$S=\phi+K8$." The statement, "$Z=\phi$," is the branch on error. The statement, "$MC=\phi$," calls for resetting the MC register and the last statement sets up the ALU for a true binary add operation, during which a constant binary 88 (10001000) is to be placed in the S register, known as the status register. The purpose of this step is a preliminary to the testing of the SUM 0 and the SUM 4 ALU check circuits. The manner in which the binary 88 is transmitted to the S register can be seen in FIG. 1 where, as a result of the binary add operation, the sum issued on to the Z bus passes through the $Z_3$ gate control by a $Z_{3a}$ control signal.

The next four microprogram steps; namely, microprogram step addresses 016, 017, 018 and 019, are utilized to test the SUM 0 ALU check. The microprogram step 016 contains the statement "$OE=1$" and, as previously described, this turns on the odd/even latch 201. The next microprogram step address 017 contains two statements; namely, "$OE=1$" and "$Z=SH^*@\phi$." The first statement is self-explanatory. The second statement calls for the performance of an AND function by the ALU, during which the contents of the high-order four positions of the S register are ANDed with zeros, during which the ALU is placed in decimal mode under control of the true complement latch, this being indicated by the symbols * and @, respectively.

The purpose of this operation is to isolate the reliability test of the checking circuits to but a single check, thereby avoiding the forced error from passing through the decimal correcting circuits; otherwise, the forced error would pass therethrough and be checked a second time, resulting in a redundant checking operation. The arithmetic and logic functions in this operation are performed as follows. In the four high-order positions of the S register, the contents (binary 8) enter the ALU by way of the A bus. At the same time, zeros in twos complement form enter the B bus as a binary 15 (1111), this developing as a result of the ALU being set to perform an AND function while in the decimal mode. The result of this operation yields a binary 8 (1000). However, being in the decimal mode, the decimal corrector is activated to subtract a 6 value, the result of this operation yielding a binary value of 2 (0010). The carry in this operation is suppressed by virtue of the fact that the ALU is performing an AND function. The effect of this entire operation is to prevent the forced error from being checked a second time during the same operation, as previously mentioned. Having checked the SUM 0 line, the program advances to the next microprogram step address 018, wherein are set forth two statements; namely, "LOAD" and "$Z=MC \forall K8L$." The statement, "LOAD," calls for resetting the latches in the manner previously set forth. The second statement calls for testing the bit 4 position of the MC register in the manner previously set forth under microprogram address step 002. The next microprogram step address 019 calls for statements "$Z=\phi$" and "$MC=\phi$." The first statement signifies a branch on error condition and the second statement sets forth the resetting of the MC register. These two operations have been previously covered under microprogram step address 003.

The final phase of the testing operation is utilized to check the SUM 4 line, this being performed by microprogram steps 020, 021, 022 and 023. These four steps are similar to the four microprogram steps 016 through 019, just explained, except that, in microprogram step address 021, the contents in the lower four bits of the S register are entered into the A bus as contrasted to entering the contents of the four high-order bit positions of the S register, as described under microprogram step address 017. In any event, the four microprogram steps 020 through 023 perform the reliability test on the SUM 4 output line of the ALU.

While the invention has been particularly shown and described with reference to a preferred embodiment thereof, it will be understood by those skilled in the art that various changes in form and details may be made therein without departing from the spirit and scope of the invention.

What is claimed is:

1. A computer system of the character described capable of performing arithmetic and logic operations under control of pattern control signals each pattern being unique for each computer step of operation, said system having both problem and testing states of operation comprising:

an arithmetic and logic unit (ALU) constituted of both positive and complementary logic elements, controllable by said pattern control signals, and having outputs transmitting both positive and negative signals respectively for each valid operation of said ALU during the problem state;

checking circuits connected to said logic outputs and operable to yield an error condition when the transmitted output signals are not complementary during the problem state;

controllable reliability test control means;

reliability test control lines interconnecting said controllable reliability test control means and said logic elements, and transmitting a quiescent level during the problem state and an active level during the reliability test state;

a read-only storage control means containing pattern generators, some assigned for problem execution during a problem state and the remaining ones assigned to the reliability operation during a testing state, said pattern generators issuing said pattern control signals, each unique to a different computer step during either the problem state or the testing state;

console switches including means controlled thereby for setting the computer from the problem state to the reliability test state by selecting said remaining ones of said pattern generators to control said logic elements during the test state; and reliability test control switching means for switching said controllable reliability test control means to effect the switching of said control lines from the quiescent level to the active level under control of said remaining ones of said pattern generators assigned to the reliability test for testing the effectiveness of said checking circuits during the reliability state of operation.

2. A computer as in claim 1 in which said arithmetic and logic unit is constituted of individual logic adders and each such adder having a pair of output lines for issuing a positive signal indicative of a sum value and a negative signal indicative of a not-sum value, said arithmetic and logic unit further including a decimal corrector interconnected with specific ones of said adder outputs and said reliability control lines constituting a pair of lines, one connected to each of said adders and the other to said decimal corrector.

3. A computer as in claim 2 in which said checking circuits are constituted of EXCLUSIVE OR circuits, each of which is interconnected with a different one of said pairs of adder output lines.

4. A computer as in claim 3 in which the switching means includes a pair of bistable devices, each connected to a different one of said control lines, and in which the reliability pattern generators include specific constant value signals for changing the state of said bistable devices in accordance with whether the computer is in either the problem state or the testing state.

5. A computer as in claim 4 in which said arithmetic and logic unit further includes carry circuits interconnecting said individual adders and including carry and not-carry output lines interconnected with said checking circuits.

6. A computer as in claim 5 in which said checking means further includes an EXCLUSIVE OR circuit interconnected with said carry output lines, and an additional pair of EXCLUSIVE OR circuits connected to the sum and not-sum output lines from the adders representing bits 0 and 4.

7. A computer as in claim 1 in which the means for switching the computer from the problem state to the reliability test state further includes address console switches and a plurality of lines interconnecting said address switches and said read-only storage means for selecting the first pattern generator in a series of pattern generators for initiating the reliability test operation.

References Cited

UNITED STATES PATENTS

| | | | |
|---|---|---|---|
| 3,051,387 | 8/1962 | Pomerene et al. | 235—153 |
| 3,166,737 | 1/1965 | Sparacio | 340—146.1 X |
| 3,257,546 | 6/1966 | McGovern | 235—153 |

MALCOLM A. MORRISON, *Primary Examiner.*

C. E. ATKINSON, *Assistant Examiner.*